May 10, 1966  B. V. KROOGOV  3,250,576
CRAWLER TRACK CHAIN HAVING RESILIENT SEALING MEANS
SURROUNDING INTERCONNECTING TIE BARS
Filed June 8, 1964

United States Patent Office 3,250,576
Patented May 10, 1966

3,250,576
CRAWLER TRACK CHAIN HAVING RESILIENT SEALING MEANS SURROUNDING INTERCONNECTING TIE BARS
Boris Vasiljevich Kroogov, Roobtzovsk, U.S.S.R., assignor to Altaisky Traktorny Zavod M. I. Kalinin, Roobtzovsk, U.S.S.R.
Filed June 8, 1964, Ser. No. 373,311
1 Claim. (Cl. 305—11)

The invention relates to crawler track chains of the kind used in the drive of traction machines, such as towing machines, tractors, and the like.

Crawler chains comprising a series of links or tracks arranged in succession and hingedly connected are known. Eyes at the ends of each link extend parallel to the centerline of the drive sprockets and are attached rigidly for example by press-fit hinge pins of tie elements which are in the form of rigid bars.

The disadvantage of such chains is the considerable wear of the hinges caused by the penetration of dirt and moisture thereinto.

In such chains provision was heretofore made for a seal protecting the chain hinges against dirt and the seepage of grease.

The disadvantage of said chains is the incomplete isolation of the sealing element from tractive forces, with consequent ensuing rapid wear and loosening of the seal.

Any attempts to overcome these difficulties and disadvantages described heretofore were unsuccessful.

An object of the invention is to provide a high-strength crawler chain wherein the hinges are protected by sealing elements which are not subject to wear and which provide permanent protection to the hinges.

Another object is to improve the service life of the seal by relieving it from the effect of tractive forces.

A third object is to enhance the tightness of the seal.

In compliance with the above and other objects, the invention contemplates a novel arrangement and combination of parts and elements hereinafter described in conjunction with the following description and appended drawings, wherein.

Figure 1:
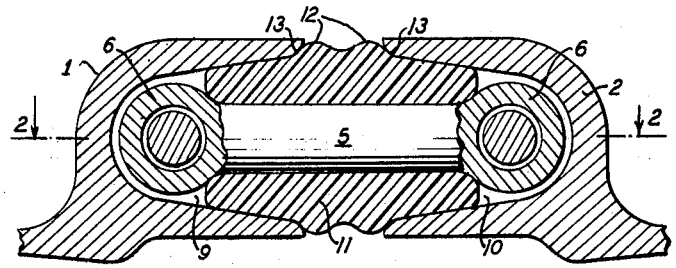
FIG. 1 is a longitudinal section of a hinged connection assembly of the links of a crawler chain.
Figure 2:
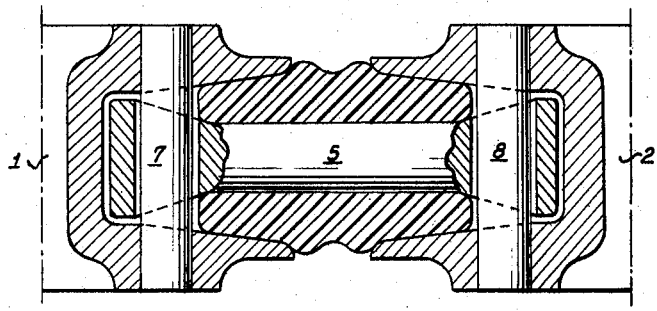
FIG. 2 is a sectional view taken along the line 2—2 of FIG. 1.

The specified crawler track chain consists of a series of successively arranged and hingedly connected links 1, 2, having ends 3, 4 with bosses thereat. The assembly of the hinged connection of the links 1 and 2 includes a connecting element in the form of a tie bar 5, provided with eyes 6 at its ends, and pins 7 and 8; the middle portions of said pins are seated in the eyes of the tie bar 5, and their ends are pressed into eyes of the bosses at the ends 3, 4 of the links. Pockets 9, 10 are formed between the faces of the bosses at the ends 3, 4 as seen in FIG. 2, said pockets tapering in widening fashion towards the extremities of the links. An elastic seal pad 11 envelopes the middle portion of the tie bar 5 between the housing eyes 6. The edges of the pad 11 correspond, as regards their shape, to those of the pockets, while the dimensions of said edges of pad 11 are such that they are seated in the pockets with interference fit.

Transverse lugs 12 in the middle portion of the pad interact with the face edges 13 of the pockets.

With the drive engaged, the tractive effort is transmitted from one link to another (e.g. from link 1 to link 2) through bar 5 and pins 7 and 8. Since the pins 7 and 8 are pressed into the bosses in the ends 3, 4 of the links 1, 2, the relative position of the links can be changed by relative turning of the bar 5 with respect to the pins. Thus, the crawler tracks are protected against wear.

If the pins and connecting element should become worn, the pins may be knocked out and replaced together with the bar. The sealing pad 11 ensures protection of the hinges against dirt, moisture, etc. while preventing seepage of grease therefrom. The seal is completely relieved from longitudinal tractive forces. The interbearing surfaces of the pad 11 and pockets 9 and 10 ensure self-adjustment of the pad in the pockets, and thus substantially improve the tightness of the seal. The transverse lugs 12 on the pads also enhance the efficient performance of the seal.

Figure 3:
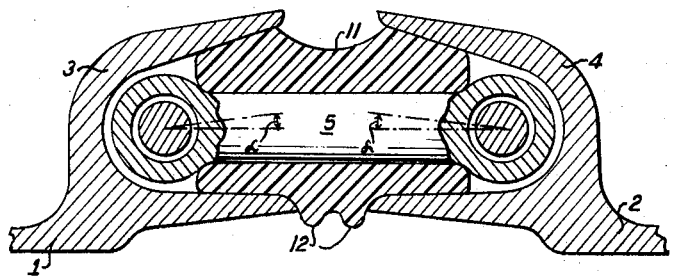
FIG. 3 is a side view of the hinged connection assembly when the drive of the chain is engaged.
Figure 4:
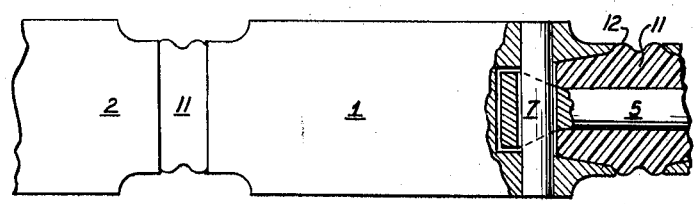
FIG. 4 is a plan view of a portion of the chain showing a complete link thereof which is broken away at one end to illustrate the connection assembly.

With the drive engaged, the links are turned in relation to one another through an angle $\alpha$ into the position shown in FIG. 3. This causes a slight strain on the pad 11. The recess between the lugs 12 facilitates compression of the pad under strain at its underside, while the shape of the pocket ensures tight bearing of the pad under strain on the pockets.

Although this invention is described in conjunction with a specific embodiment thereof, it should be understood by those skilled in the art, that modifications and variations may be resorted to without departing from the spirit and scope of the invention as defined in the appended claim.

I claim:

A chain comprising a series of successively arranged links with bossed ends, said bossed ends defining pockets at the ends of said links, said bossed ends having eyes which open into said pockets, said eyes having axes extending substantially normal to the vertical longitudinal plane of the chain, longitudinal tie bars positioned between the ends of adjacent links, said bars having ends with eyes which are positioned in said pockets, pins joining the bars and links together, said pins including a middle portion which is seated in the eyes of respective tie bars, while the ends of said pins are seated in the eyes of the bossed ends of the associated links and elastic elongated sealing pads enveloping the tie bars, said pads having ends which are seated in the pockets of adjacent links, said ends of the pads having a shape corresponding to that of the pockets, while the dimensions of said ends of the pads are such that interference fit of the pads in the pockets is provided.

References Cited by the Examiner

UNITED STATES PATENTS 1,680,624  8/1928  Knox _____ 305—14 X
2,087,396  7/1937  Bennett _____ 305—58

BENJAMIN HERSH, *Primary Examiner.*

R. J. JOHNSON, *Assistant Examiner.*